Dec. 24, 1940.   W. W. POTTER   2,225,886
POWER TRANSMITTING MECHANISM
Filed April 20, 1939   2 Sheets-Sheet 2
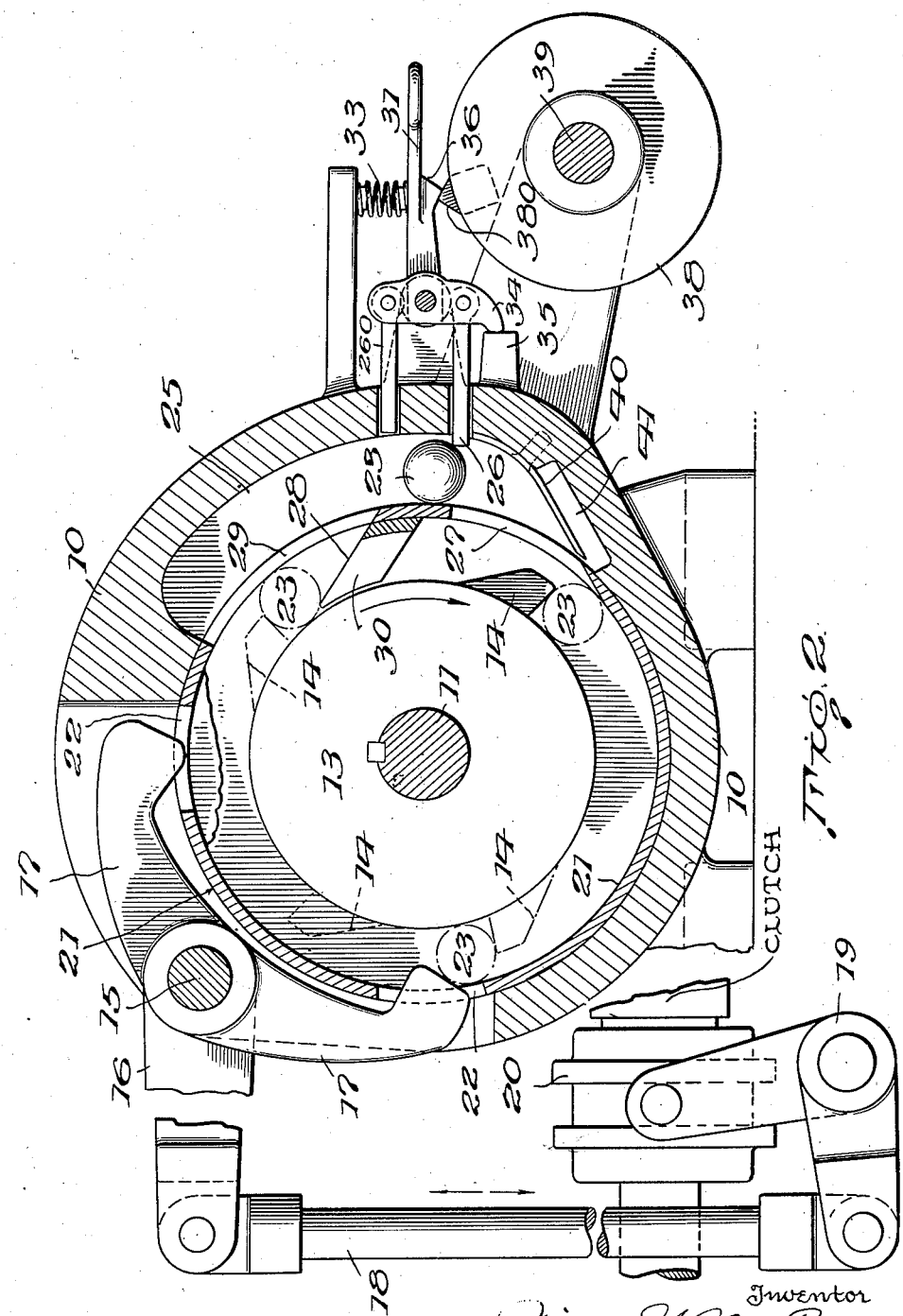

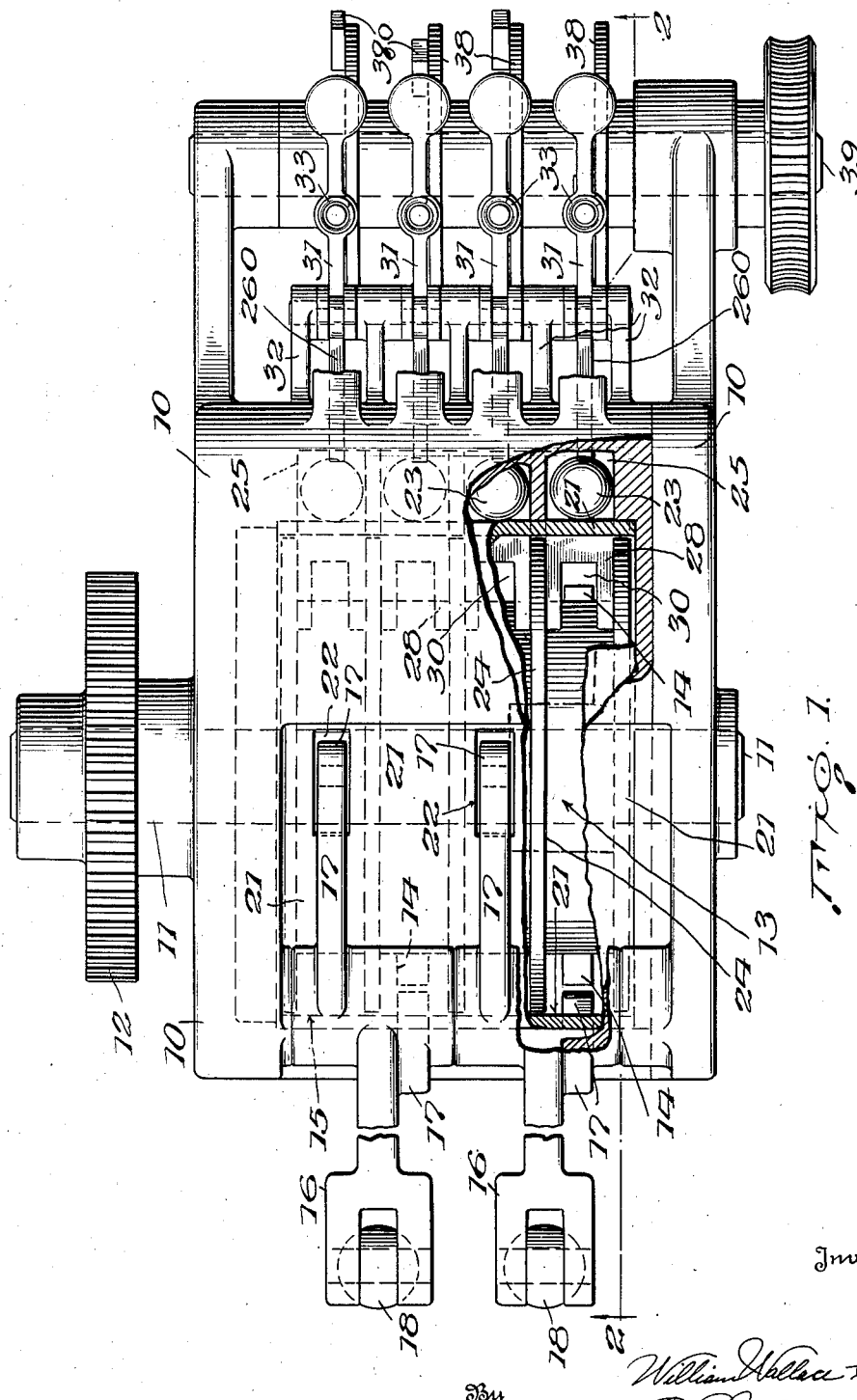

Patented Dec. 24, 1940

2,225,886

UNITED STATES PATENT OFFICE 2,225,886

POWER TRANSMITTING MECHANISM

William Wallace Potter, Narragansett, R. I.

Application April 20, 1939, Serial No. 268,965

12 Claims. (Cl. 74—25)

My invention relates to power transmitting mechanism of the type or class for intermittent or periodical impartation of motion from one machine member which forms or may be the source of motion, to another, the cessation of motion of the power-receiving member not requiring at the instant of its stoppage the ending of motion of the other.

In making my invention, I have had various objects in view, all of which may be achieved by such a mechanism, which, by way of example and not limitation, I show in the drawings and shall presently describe in detail.

A brief general description of that mechanism, given in advance of the detailed description, will facilitate the understanding of that mechanism and its action or operation. It comprises a normally constantly rotating shaft driven from a suitable prime mover as the source of motion, and a shaft on which is mounted for oscillating motion a lever for imparting to and fro motion to a machine element which must be moved periodically or intermittently. Said lever has two arms which extend in opposite directions from the shaft, these two arms being means to rock the lever in one direction or the other when, by a power coupling device, the constantly rotating shaft has an operative connection for an interval with one arm or the other. Said power coupling device is first placed in power-receiving relation with said constantly rotating shaft, and partakes of circular motion therewith until it contacts with and moves the appropriate one of said arms. After moving the latter a short distance, it passes out of contact therewith and later passes out of driving engagement with the constantly rotating shaft. Said coupling device is a loose or free body, in the sense of having no physical connection with the parts with which it cooperates. Selective means, either automatically operated, or hand operated, or both, determine the time of the cooperative action of said device and said shaft, and which arm of the lever shall be actuated and, therefore, in what direction the lever shall rock.

A very important feature of my invention is that only a small movement of the selecting means and only slight force or power to produce said movement are required for the production of a relatively considerable movement of relatively great force of the rock shaft lever of the machine member whose periodical or intermittent movement is required. Another important feature is that it is impossible to attempt to move the lever in opposite directions simultaneously. Other features, such as safety means to prevent jamming, will be apparent from the specification.

Mechanism embodying my invention is applicable in many relations. To speak of one very useful application, (merely by way of illustration and not restriction of the broad scope of my invention) I mention machine tools of the automatic chucking machine type, which have clutch or other shiftable parts. In such machines it is desirable that the clutches, for example, be shifted as nearly instantaneously as possible and with substantial movement to avoid wear, especially in the case of friction clutches. It is also desirable, or necessary, to have the selection of the time of shifting and the initiation of the clutch movement effected by a comparatively slow moving device with but slight movement thereof.

My invention consists in whatever is defined by or is included within the scope of the appended claims.

In the drawings:

Fig. 1 is a plan view, with frame or casing portions shown broken away, better to show some of the interior parts, of a mechanism which, at the present time, I consider a satisfactory, but not exclusive, embodiment of my invention;

Fig. 2 is a section on the line 2—2 of Fig. 1.

Describing next, with some detail, the construction shown in the drawings, there is a chambered frame 10 roughly cylindrical in cross section, through the horizontal axis of which in suitable bearings at the ends extends shaft 11 which beyond the frame at one side has a gear wheel 12 to which driving power from a suitable motor is imparted to rotate the shaft, normally constantly. To such shaft, in side by side but spaced relation, are keyed similar discs or wheels 13 (four in number) each of which has on its periphery a single radial lug or tooth 14 with a radial face, or side, presented in the direction of revolution of the wheel. It is by means of this tooth 14 that motion is transmitted to a lever 16, mounted for oscillation on the horizontal shaft 15 which is mounted in bearings on the frame 10 parallel with the power shaft 11, by acting on one of the two oppositely extending radial arms 17 of the lever 16. There are four such radial arms, each two constituting a pair of a unit, and two of the wheels 13 constitute a pair, forming with a pair of radial arms 17, a unit for the machine member or device which receives its to and fro movement from the lever 16 of the unit. Thus, there are two duplicate units shown and the lever 16 of each unit has pivoted to it one end of a connecting rod 18 whose other end is connected to the machine member to be reciprocated. Thus, as shown in Fig. 2, such rod is shown connected with a bell crank lever 19 which engages the sleeve 20 of a sliding clutch, for as a mere illustration, a clutch shifting device is shown. It is to be understood that any number of units can be driven by the same shaft 11 and controlled by the same shaft 39.

The two teeth of a unit are situated so far apart circumferentially—preferably 180°—that it is impossible for the two simultaneously to act on the respective lever arms 17 of a single lever 16, which at their free ends are about 90° apart, and which, could it happen, would result in the two teeth tending to rock the lever in opposite directions. As the free ends of the arms 17 of any one lever 16 are approximately 90° apart, it is apparent that each disc 13 may carry a plurality of teeth 14 if so desired, provided the teeth on the two adjacent discs which act on a single lever 16 are spaced circumferentially at least 90° apart.

The lever and its arms are in form and motion like an escapement lever and the free ends of the arms are alternately placed in position for the shifting action I have described, which results in shifting the clutch or other slidable member first in one direction and, then, in the opposite direction.

Within the frame 10 and spaced between the lever arms 17 and the wheels 13, and concentric with the latter, is a cylindrical shell or liner 21, which has a slot 22 contiguous to the free end of each arm and through which the arm ends may play, when the arms are swung in and out by the action of the wheels.

The wheel teeth do not directly engage the arm ends, but act thereon through the intermediary body, preferably a ball 23, which when in operative position, is in the circular path of the proper tooth, and lying between the wheel periphery and the inner wall of the liner and between two side walls 24 adjoining opposite sides of the wheel. This intermediary body or ball 23, when engaged by the tooth on its forward side, travels therewith in such circular path until it encounters the inwardly projecting free end of a radial arm 17 and, by pressure thereon, swings it outward and rocks the lever 16 and the other arm 17 to thrust its free end through the adjacent liner slot 22 in position for engagement by a ball if and when the latter, by the operation of the selective mechanism provided, is in the circular path of the tooth of the adjacent wheel of the unit.

The ball 23, except when in the path or orbit of the wheel tooth, is in an arcuate chamber or pocket 25 in the frame 10 contiguous to and concentric with the liner for something less than about 90° from near the liner top downwards and, being supported at or near the lowest point of said chamber by the inner end of a horizontally slidable stop or detent 26 which, until it is withdrawn from beneath the ball, prevents it from moving by gravity through an adjacent slot 27 in the liner wall into the circular path of the wheel tooth. The ball, having completed its work of travelling with the tooth and acting on a radial arm to swing it outwardly, is thrown or removed, by contact with an inclined guide 28 in the tooth path and through a slot 29 in the liner wall, into the arcuate chamber 25 and falls to the bottom thereof and rests on the detent 26, where it remains until again called into action by the selective mechanism. The guide 28 has a slot 30 for the passage of the tooth 14. The detent 26 passes through a slot in the frame wall, and, outside the latter, is pivotally connected at its end to a horizontally extending lever 31 pivoted at its inner end between lugs 32 projecting outward from the frame wall. The lever 31 being rocked upward at its outer end, either by hand or automatically, will withdraw the detent 26 from beneath the ball thereon. A coil spring 33 acting on the top of the lever presses it downward and yieldably holds the detent 26 in the ball path. Such movement of the detent by the spring is limited by a lug 34 on the bottom of the lever striking a stop 35 projecting outward from the wall of frame 10.

The outer end of lever 31 is fitted for hand operation and, for automatic action, the underside of the lever has a cam lug 36 for engagement by a cam tooth or dog 380 on the side of a disc 38 fixed to and rotating with a shaft 39 having bearings on the frame 10 and geared to a proper shaft of the machine, not shown. It will be understood that there is a selection lever 31 for each of the four ball-moving wheel shown and, of course, a dog-carrying disc 38 for each lever 31.

Besides the ball detent 26, each lever has a similar detent 260 pivoted to it above and at the opposite side of the lever pivot, which upper detent will be in the path of and stop the ball, if, at the time it is descending through the arcuate chamber 25, the lower detent 26 is withdrawn. Movement of one detent by the lever 31 is simultaneously accompanied by movement of the other, but in the opposite direction.

It will be evident that the only motion required is a short one to cause the selection mechanism to release a ball to initiate the action of rocking the lever 16 to shift the clutch or other machine member, and but little power or force is required—only enough to overcome the slight weight of lever 31 and the weak spring 33—to call into play the great power required and exerted through the driving shaft 11 to do that shifting by said lever 16. The force thus so easily and quickly called into play and stopped and the speed with which the lever 16 moves and its large arc of swing, are supplied or produced by the power shaft 11.

As a safety device to prevent jamming of the ball in passing from the chamber 25 into the orbit or circular path of the propelling tooth 14, the bottom of the chamber 25, adjacent the liner slot 27 for the passage of the ball from the chamber, is constructed to yield under jamming pressure exerted on the ball, as by means of a flat spring 40 extending over a slot or recess 41 in the frame 10, into which said spring can move.

The side walls 24 of the annular chamber, which contains each circular path through which the teeth of wheels 13 pass, may be formed by thin discs placed between adjacent wheels 13 and of a diameter just to clear the inner periphery of the liner.

From the description or exposition I have given of the nature and scope of my invention, and of the mechanism in which I have embodied it, it will be evident the scope of the protection to which I am entitled is to be ascertained by reference to the following claims.

What I claim is:

1. In a controllable power transmitting mechanism for selectively and intermittently transmitting motion between driving and driven parts, the combination of a movable element that is a source of motion, a second element to receive motion for a limited period from the first-mentioned element and capable of movement in opposite directions, third movable elements that take motion from said first-mentioned element and impart motion to said motion-receiving element for actuating the latter in both directions of its movement, and means preventing said third elements transmitting motion from the movable element to the motion-receiving element in two directions simultaneously.

2. In a controllable power transmitting mechanism for selectively and intermittently transmitting motion between driving and driven parts, the combination of a movable element that is a source of motion, a second element to receive motion for a limited period from the first-mentioned element and capable of movement in opposite directions, third movable elements that take motion from said first-mentioned element and impart motion to said motion-receiving element for actuating the latter in either direction of its movement, said third elements being loose, freely movable bodies, and means preventing said third elements transmitting motion from the movable element to the motion-receiving element in two directions simultaneously.

3. In a controllable power transmitting mechanism, a pair of power receiving members, selectively controllable movable bodies for transmitting motion to said members, a source of rotary motion comprising means for moving the movable bodies in an orbit thereabout and in contact with said power receiving members to impart motion thereto, said members being movable into and out of said orbit of said bodies, each of said members being moved out of said orbit when power is imparted thereto by one of said bodies and remaining out of said orbit, and an operative connection between said members whereby when one of said members is moved out of the orbit of its power imparting body, the other of said members is moved into the orbit of its power imparting body.

4. In a controllable power transmitting mechanism, a pair of power receiving members, selectively controllable movable bodies for transmitting motion to said members respectively, a source of rotary motion comprising means for moving the movable bodies in an orbit thereabout and in contact with said power receiving members to impart motion thereto, said members being movable into and out of said orbit of said bodies, each of said members being moved out of said orbit when power is imparted thereto by one of said bodies and remaining out of said orbit, and an operative connection between said members whereby when one of said members is moved out of the orbit of its power imparting body, the other of said members is moved into the orbit of its power imparting body, the power imparting bodies for each member moving in a separate orbit.

5. In a controllable power transmitting mechanism, the combination of a rotatable power-imparting element, lever means having two relatively offset power receiving members each, when operated, imparting motion to said lever means in opposite direction to that of the other; normally inactive bodies movable in orbital paths by said rotatable element into contact with and past said members which are movable to and from said paths of motion of said bodies respectively, said bodies being unattached to either said elements or members and being shiftable relative to said rotatable element to place them in and out of cooperative contact with said rotatable element, means including a shiftable stop to hold said bodies in their non-cooperative position, and manual and automatic means to shift said stop to release said bodies at selected times.

6. In a controllable power transmitting mechanism, the combination of a rotatable power-imparting member, a casing means about and spaced from said rotatable member to provide at least two concentric guiding paths of movement for a body, means for causing such a body of each path to enter and leave such path at certain points, and a power-receiving member movably supported exterior to said casing and of lever form, with oppositely acting arms, each of which has the portion movable into and out of one of said paths, and there being a body in each guidepath for coacting with the arm therein, the movement of which arm into its said guidepath exposes it to pressure contact from said body, thereby to impart movement thereto.

7. In a controllable power transmitting mechanism, the combination of a rotatable power-imparting element, a lever-form power receiving element having oppositely acting parts, means for transmitting power from one to the other of said elements comprising normally inactive free bodies, one for each oppositely acting part, movable by said rotatable element into contact with and past its part of said lever element and which parts are movable to and from the path of motion of their actuating bodies, said bodies being unattached to either of said elements and shiftable relatively to said rotatable element to place it in and out of cooperative contact therewith, and a chamber being provided to receive and temporarily hold said body.

8. In a controllable power transmitting mechanism, the combination of a rotatable power imparting member, a casing about the same spaced therefrom to provide a concentric guiding path of movement for a free body, an arcuate chamber offset from and concentric with said guiding path, means for causing such a body to enter into said chamber from said path and, conversely, causing said body to re-enter said path; and a lever-form power-receiving member movably supported exterior to said casing, a portion of which is movable into and out of said path, the movement into the path exposing it to pressure contact from said body, thereby to impart movement thereto.

9. In a controllable power transmitting mechanism, the combination of a rotatable element, a second movable element, means to impart motion from said rotatable element to said second element comprising a free body interposable between said two elements and cooperatively contacting both, and means compelling said body to move in a substantially circular path traversed by said rotatable element for only a portion of that path, a pocket offset from said path to receive said body from the path and to redischarge said body into said path, and means controlling the discharge of the body into said path.

10. In a controllable power transmitting mechanism, the combination of a rotatable element, a second movable element, means to impart motion from said rotatable element to said second element comprising a free body interposable between said two elements and cooperatively contacting both, a raceway for said body concentric with the axis of rotation of said rotatable element, said rotatable element having a body engaging tooth that passes through said raceway, means at a point about the race-way for shunting said body out of the race-way and discharging the body thereinto, and resiliently yieldable means disposed at the discharge side of said shunting means to prevent jamming of the free body when passing from said shunting means into said raceway.

11. A mechanism as in claim 7, in which the chamber opens into the path in which the body travels with the rotatable element, and has a cushion over which the body passes into such path.

12. A mechanism as in claim 6 in which there is means to remove the bodies from their guidepaths, and control means for restoring said bodies to their guidepaths at selected times.

WILLIAM WALLACE POTTER.